Figure 1:
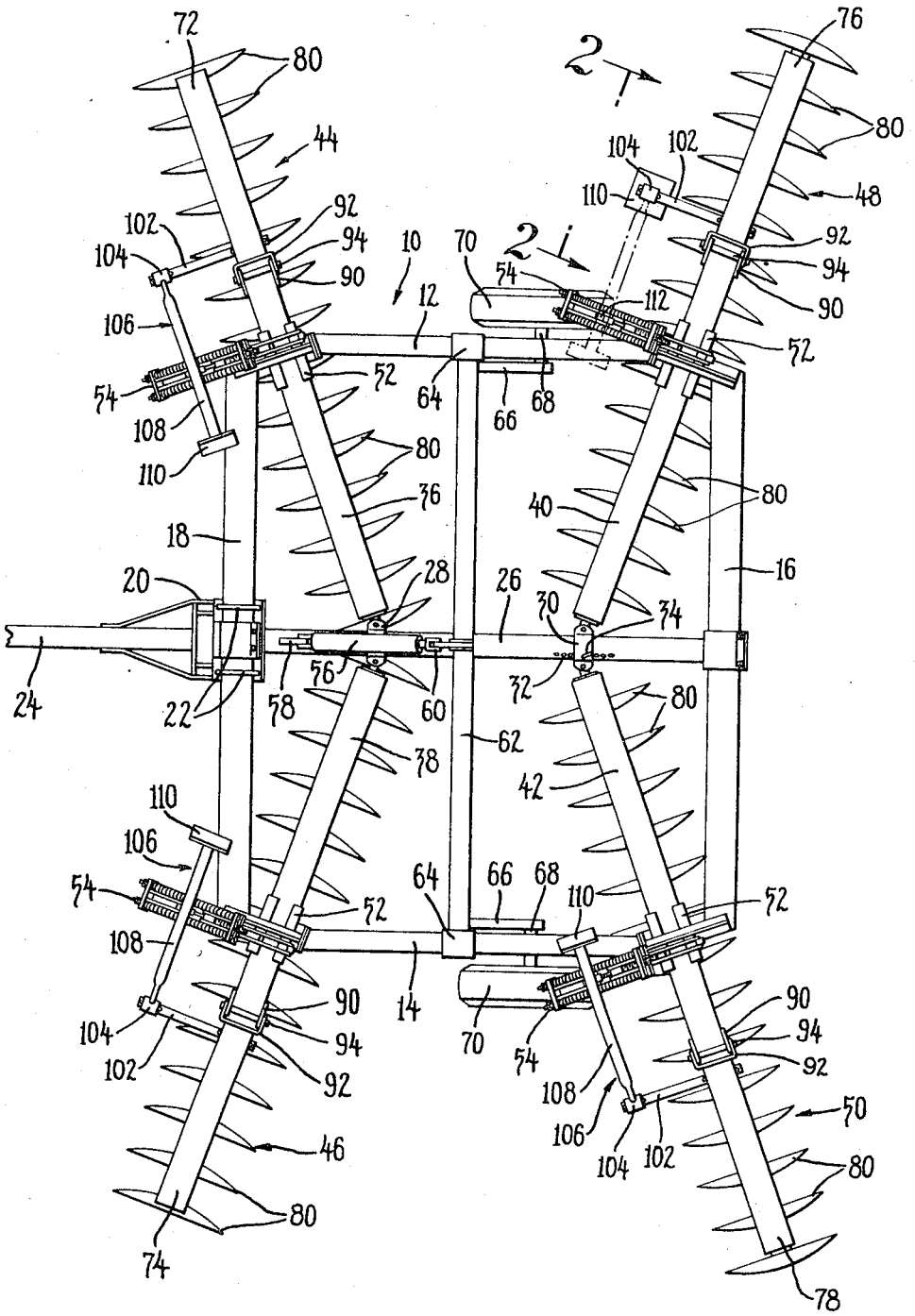
Figure 2:
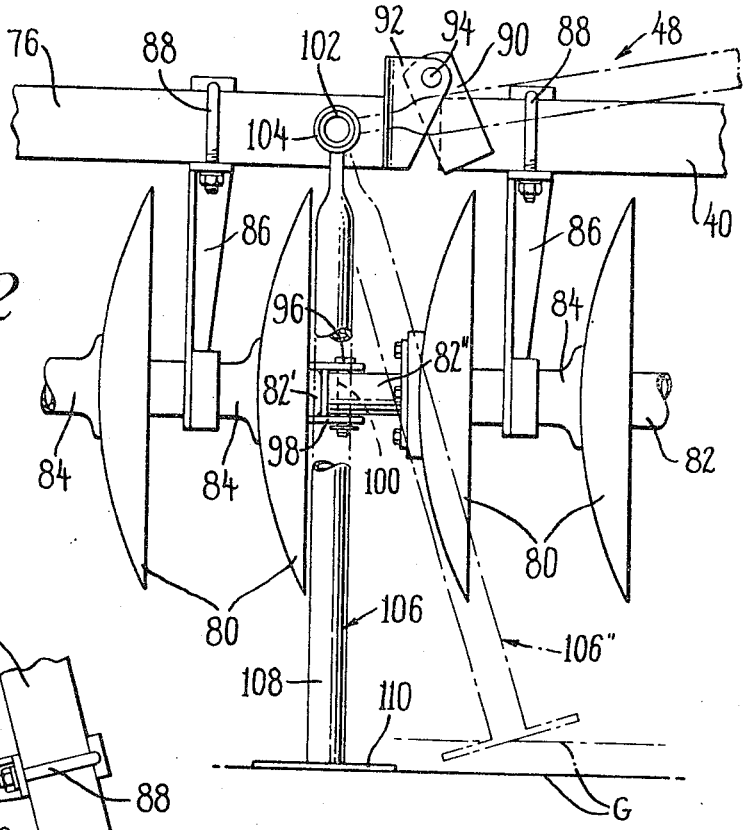
Figure 3:
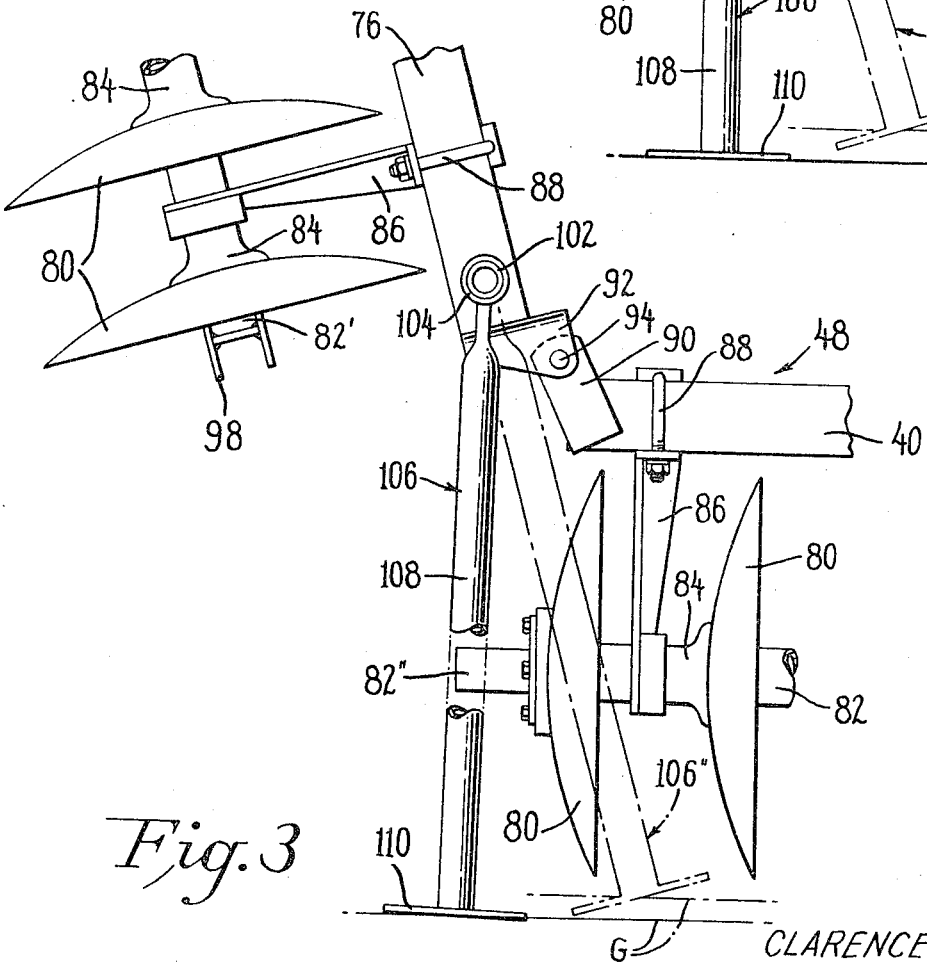
Figure 4:
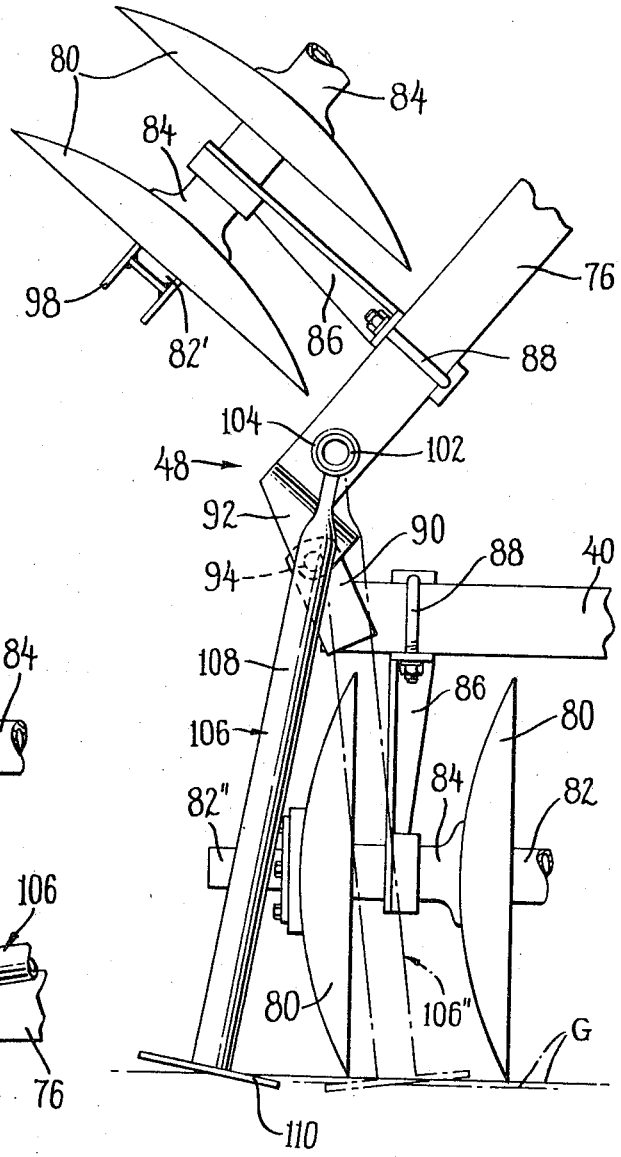
Figure 5:
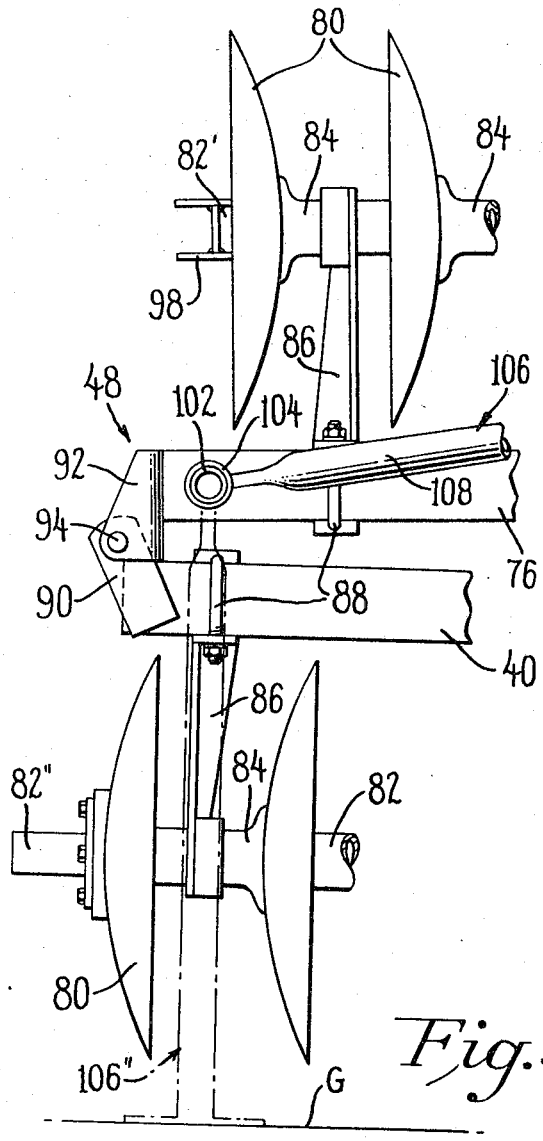

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 2, 1970

875 O.G. 11

T875,003
FOLDING FRAME IMPLEMENT

Clarence B. Richey, Royal Oak, Mich., assignor to Massey-Ferguson Inc., Detroit, Mich., a corporation of Maryland

Filed June 18, 1969, Ser. No. 834,259
Int. Cl. A01b *63/00*
U.S. Cl. 172—456
3 Sheets Drawing. 8 Pages Specification

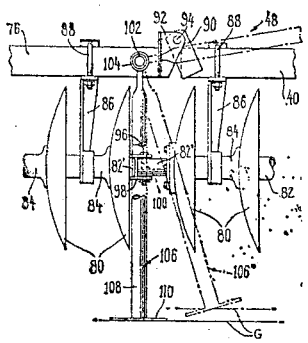

A disc harrow comprises a rectangular frame and pairs of front and rear gangs having discs 80. A foldable wing such as 76 is provided at the end of each gang such as 48 to enable folding to a narrower dimension for transport. Each wing is pivotally connected at 94 to the gang frame member 40 and its axle 82' has a removable pin connection 96 to the frame axle 82". Each wing is provided with a leg 106 which is pivoted at 102 to its frame member 76 at a distance spaced from the wing pivot point 94. The legs are moved from an elevated substantially horizontal phantom line stored position to a depending solid line ground engaging position so that, upon subsequent removal of pin 96 and lowering of the disc harrow, the legs will force the wings to pivot up to a near-vertical position. From this position each wing may be carried over-center manually or by inertia if lowering is quick enough. However, the preferred mode of moving each wing over center is by further lowering the disc harrow. To accomplish this, the legs 106 must depend below the bottoms of discs 80 a distance greater than the sum of the distance between pivots 94 and 102 and the vertical distance each pivot 102 lies below pivot 94 in the unfolded position shown. Upon going over center each wing is held in an intermediate position by the leg. Raising of the disc harrow will cause the leg to gently lower the wing into its folded position for travel. Unfolding of the wing is accomplished in a like manner and the phantom line position 106" of the leg illustrates how the leg controls the descent of the wing to the illustrated unfolded position.

June 2, 1970 C. B. RICHEY T875,003

FOLDING FRAME IMPLEMENT

Filed June 18, 1969 3 Sheets-Sheet 1

INVENTOR.
CLARENCE B. RICHEY
BY
Tweedale & Gerhardt
ATTORNEYS

June 2, 1970 C. B. RICHEY T875,003

FOLDING FRAME IMPLEMENT

Filed June 18, 1969 3 Sheets-Sheet 2

INVENTOR.
CLARENCE B. RICHEY.
BY
Tweedale & Gerhardt
ATTORNEYS

June 2, 1970 C. B. RICHEY T875,003

FOLDING FRAME IMPLEMENT

Filed June 18, 1969 3 Sheets-Sheet 3

INVENTOR.
CLARENCE B. RICHEY
BY
Tweedale & Gerhardt
ATTORNEYS